US008850014B2

(12) United States Patent
Ceccarelli et al.

(10) Patent No.: US 8,850,014 B2
(45) Date of Patent: Sep. 30, 2014

(54) HANDLING FAILURE OF REQUEST MESSAGE DURING SET UP OF LABEL SWITCHED PATH (75) Inventors: Daniele Ceccarelli, Genoa (IT); Diego Caviglia, Savona (IT); Francesco Fondelli, Calcinaia (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 464 days.

(21) Appl. No.: 12/994,318

(22) PCT Filed: Jun. 14, 2010

(86) PCT No.: PCT/EP2010/058306

§ 371 (c)(1),
(2), (4) Date: Nov. 1, 2011

(87) PCT Pub. No.: WO2011/137936

PCT Pub. Date: Nov. 10, 2011

(65) Prior Publication Data

US 2012/0042077 A1    Feb. 16, 2012

(51) Int. Cl.
*G06F 15/173* (2006.01)
*H04L 29/06* (2006.01)
*H04L 12/913* (2013.01)
*H04L 12/723* (2013.01)
*H04L 12/701* (2013.01)
*H04L 12/54* (2013.01)
*H04L 12/911* (2013.01)

(52) U.S. Cl.
CPC .............. *H04L 47/724* (2013.01); *H04L 69/14* (2013.01); *H04L 45/50* (2013.01); *H04L 45/00* (2013.01); *H04L 47/825* (2013.01); *H04L 12/5691* (2013.01)

USPC ............................. 709/226; 709/237; 709/238

(58) Field of Classification Search
CPC ........ H04L 45/50; H04L 45/00; H04L 47/825; H04L 45/507; H04L 47/724
USPC .................................. 709/226, 238; 370/400
See application file for complete search history.

(56) References Cited

U.S. PATENT DOCUMENTS

| 6,529,958 | B1 * | 3/2003 | Oba et al. ........................ 709/237 |
| 8,325,737 | B2 * | 12/2012 | Caviglia et al. ............... 370/400 |
| 8,339,942 | B2 * | 12/2012 | Liu et al. ........................ 370/218 |
| 8,451,846 | B1 * | 5/2013 | Ayyangar ................... 370/395.5 |
| 2009/0080450 | A1 * | 3/2009 | Xiao et al. ..................... 370/410 |
| 2009/0086623 | A1 * | 4/2009 | Gao et al. ....................... 370/221 |
| 2011/0032938 | A1 * | 2/2011 | Kunjidhapatham et al. .. 370/392 |
| 2011/0069609 | A1 * | 3/2011 | Le Roux et al. ............... 370/221 |
| 2011/0090786 | A1 * | 4/2011 | Liu et al. ........................ 370/221 |
| 2013/0301402 | A1 * | 11/2013 | Ceccarelli et al. ............ 370/216 |

* cited by examiner

*Primary Examiner* — Oanh Duong
(74) *Attorney, Agent, or Firm* — Baker Botts L.L.P.

(57) ABSTRACT

Setting up a label switched path (LSP) for traffic between nodes of a network, involves sending a request message requesting reservation of resources for the requested LSP, from an ingress node (10) via intermediate nodes (40) and returning an acknowledgement message to an upstream node along the path. Absence of an acknowledgement from the downstream node, that the request message was received, is detected. Whether the given node should react to the detected absence can be determined from an indication (R) in the request message. Thus other nodes can react more quickly to take remedial action, to reroute or to remove the resource reservations without a long wait for a time out or a refresh message from the waiting ingress node, to enable more efficient use of the resources.

15 Claims, 7 Drawing Sheets

PATH MESSAGE_ID object
0102 = React upon delivery failure (R) with how to react (T)

Class = 23, C_Type = 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    |T|...|R| |                    Epoch                       |
+-+-+-+-+-+-+-+-+-+-+-+-+-+-+-+-+-+-+-+-+-+-+-+-+-+-+-+-+-+-+-+-+
|                       Message_Identifier                      |
+-+-+-+-+-+-+-+-+-+-+-+-+-+-+-+-+-+-+-+-+-+-+-+-+-+-+-+-+-+-+-+-+
```

FIG 10

ACKNOWLEDGEMENT MESSAGE_(ID_ACK object)
0x01 = React upon delivery failure (R)

Class = 24, C_Type = 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       |R|                         Epoch                       |
+-+-+-+-+-+-+-+-+-+-+-+-+-+-+-+-+-+-+-+-+-+-+-+-+-+-+-+-+-+-+-+-+
|                       Message_Identifier                      |
+-+-+-+-+-+-+-+-+-+-+-+-+-+-+-+-+-+-+-+-+-+-+-+-+-+-+-+-+-+-+-+-+
```

HANDLING FAILURE OF REQUEST MESSAGE DURING SET UP OF LABEL SWITCHED PATH

This application is the U.S. national phase of International Application No. PCT/EP2010/058306, filed 14 Jun. 2010, which designated the U.S. and claims priority to EP Application No. 10162172.0, filed 6 May 2010, the entire contents of each of which are hereby incorporated by reference.

TECHNICAL FIELD

This invention relates to methods of setting up a label switched path (LSP) for traffic between nodes of a network, and to nodes of such a network able to act as an intermediate node along the path and set up a label switched path (LSP) for traffic to others of the nodes, and to nodes able to act as an ingress node for the path.

BACKGROUND

Optical Transport Networks such as those specified in the ITU-T G.709 recommendation are known, having a control plane to control nodes of such networks to reserve (set up) new paths by sending messages between the nodes to reserve resources at each node.

Classical RSVP (Resourse reSerVation Protocol) [RFC2205] signaling protocol is a known protocol for messages sent between nodes to set up new paths. RSVP-TE (RSVP-Traffic Engineering) [RFC3209] extends RSVP in order to provide a way to establish Label Switched Paths (LSPs) in MPLS (Multi-Protocol Label Switching). To reserve a path, an RSVP-TE (Traffic Engineering) PATH message, in the form of a Generalized Label Request, is sent out from the first node (which acts as an ingress node) via intermediate nodes along the proposed path, to the last node (acting as an egress node). The egress node returns an RSVP-TE RESV message to the ingress node, back along the path to cause the nodes along the path to confirm the reservation of resources such as bandwidth on switch paths and ports, for the requested path, for traffic of a signal type specified in the message.

It is non reliable in the sense that it relies on other mechanisms if a message is lost. It can recover from message lost via RSVP refresh messages. For example, if the sole tear message transmitted is lost, then resources will only be deallocated once the "cleanup timer" interval has passed.

RSVP-TE does not change the intrinsic RSVP unreliability described above.

GMPLS (Generalized MPLS) [RFC3945] generalized the concept of LSP. An LSP became regarded as meaning "any possible form of connection which someone is willing to control". Again, GMPLS does not change the intrinsic RSVP unreliability aspect.

The message identification and acknowledgment mechanism defined in [RFC2961] addresses this problem. It provides a retransmission mechanism which can be applied to any RSVP signaling message (i.e. can be used in any context: RSVP, RSVP-TE).

[RFC2961] describes a number of RSVP-TE extensions for the support of reliable message delivery on a per hop basis. Standard RSVP, as defined in [RFC2205] keeps its state alive via the generation of refresh messages. Refresh messages are used to both synchronize node states between RSVP-TE neighbors and to recover from the loss of RSVP-TE messages. The use of refresh messages is relied on to recover from many different possible failure scenarios. This can be unsatisfactory.

SUMMARY OF THE INVENTION

An object of the invention is to provide improved apparatus or methods. According to a first aspect, the invention provides: a method of setting up a label switched path (LSP) for traffic between nodes of a network, has steps of, at a given one of the nodes: receiving a request message requesting reservation of resources for the requested LSP, the request message being sent from an ingress node of the requested path, via intermediate nodes along the path to an egress node, and returning an acknowledgement message to an upstream node along the path, to acknowledge receipt of the request message. The request message is also sent on to a downstream node along the path, and there is a step of detecting receipt or absence of an acknowledgement from the downstream node, the acknowledgement representing that the request message was received, or that a resend of the request message was received. Then there is a step of determining whether the given node should react to the detected absence, and later, a step of receiving a return message sent from the egress node if the request message reaches the egress node, to cause the nodes along the path to use the reserved resources to set up the requested path.

This can enable some or all of the intermediate nodes to react more quickly to take remedial action, to reroute or to remove the resource reservations for example, without waiting for some other mechanism such as a time out or a refresh message from the waiting ingress node. This in turn can enable more efficient use of the resources.

Any additional features can be added to those discussed above, or disclaimed and some are described in more detail below.

Another aspect of the invention can involve a similar method, for an ingress node rather than an intermediate node. This has steps of sending a request message for the reservation of resources for the requested LSP, the request message being sent from the ingress node of the requested path, via intermediate nodes along the path to an egress node, and receiving an acknowledgement message from a downstream node along the path, to acknowledge receipt of the request message, or that a resend of the request message was received. A further step is sending an indication in respect of this requested path, to a downstream node, indicating whether the downstream node should react to an absence of a corresponding acknowledgement message from a further downstream node, and, if the request message reaches the egress node. The ingress node can receive a return message sent from the egress node if the request message reaches the egress node, to cause the nodes along the path to use the reserved resources to set up the requested path.

Another aspect provides a corresponding program for a computer, to carry out the method.

Another aspect provides a corresponding node to act as an intermediate node. In this case, the node has a processor having a first input part arranged to receive from a node downstream, a request message for the reservation of the requested LSP, sent from an ingress node of the requested path, via intermediate nodes along the path to an egress node, a first output part arranged to return an acknowledgement message to an upstream node, to acknowledge receipt of the request message, and a second output part arranged to send the request message on to a downstream node along the path. The second input part is arranged to receive an acknowledgement from the downstream node that the request message was received, or that a resend of the request message was received, and the processor is arranged to detect receipt of, or an absence of, the acknowledgement, and to determine whether the given node should react to the detected absence. A second input part is provided to receive a return message sent from the egress node if the request message reaches the egress node, the processor being arranged to use the reserved resources to set up the requested path in response to the return message.

Another aspect provides a corresponding node to act as an ingress node. It has an output part arranged to send an indication in respect of this requested path, to a downstream node, indicating whether the downstream node should react to an absence of a corresponding acknowledgement message from a further downstream node. Any of the additional features can be combined together and combined with any of the aspects, or any such features can be disclaimed. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise a program encoded in media for performing any kind of information processing. It may comprise software encoded in a disk or other computer-readable medium and/or instructions encoded in an application specific integrated circuit (ASIC), field programmable gate array (FPGA), or other processor or hardware.

References to switching nodes can encompass any kind of switching node, not limited to the types described, not limited to any level of integration, or size or bandwidth or bit rate and so on.

References to software or program can encompass any type of programs in any language executable directly or indirectly on processing hardware.

References to hardware, processing hardware, processor or circuitry can encompass any kind of logic or analog circuitry, integrated to any degree, and not limited to general purpose processors, digital signal processors, ASICs, FPGAs, discrete components or logic and so on.

Some Abbreviations

GMPLS Generalized Multi Protocol Label Switching
IANA Internet Assigned Numbers Authority
ID Internet Draft
IETF Internet Engineering Task Force
LSP Label Switched Path
MPLS Multi Protocol Label Switching
OTN Optical Transport Network
RFC Request For Comment
RSVP ReSource reserVation Protocol
RSVP-TE ReSource reserVation Protocol-Tunnel Extensions
SDH Synchronous Digital Hierarchy
Introduction By way of introduction to the embodiments, some issues with conventional designs will be explained. It is now appreciated that the reliance on refresh messages recover from many different possible failure scenarios has resulted in a number of operational problems, such as scalability issues, signaling reliability and latency. Scaling problems are linked to the resource requirements (in terms of processing and memory) required for running RSVP, while reliability problems can occur when a non-refresh RSVP message is lost in transmission.

Since RFC 2961 does not define any actions to be taken in case of message delivery failure, embodiments of the present invention can address this gap, enabling consequent actions for each possible failure to be defined and controlled. In some embodiments of the present invention, extensions to [RFC2961] are set out to address these issues. In particular they support reliable delivery with the definition of an Ack message, which can be used to detect message loss and support reliable RSVP message delivery on a per hop basis. The extensions can be in the form of new objects, namely MESSAGE_ID and MESSAGE_ID_ACK, to support acknowledgment messages and reliable RSVP message delivery on a per hop basis, as will be described in more detail below. By way of introduction, the protocols which can be extended in this way will be explained.

Existing Protocols:

Examples of control planes can use Generalized Multi-Protocol Label Switching (GMPLS), which extends MPLS from supporting Packet Switching Capable (PSC) interfaces and switching to include support of four new classes of interfaces and switching: Layer-2 Switching (L2SC), Time-Division Multiplex (TDM), Lambda Switch (LSC), and Fiber-Switch (FSC) Capable.

A functional description of the extensions to MPLS signaling that are needed to support these classes of interfaces and switching is provided in RFC3471, while RFC3473 describes the ReSource reserVation Protocol (RSVP-TE) specific formats and mechanisms needed to support all four classes of interfaces. RFC 4328 presents the technology details that are specific to G.709 Optical Transport Networks (OTN). Such parameters are carried through the signaling protocol in dedicated traffic parameter objects. Moreover RFC 4328 defines how to encode such labels when these G.709 traffic parameters are used.

G.709 defines several networking layers constituting the optical transport hierarchy:
  with full functionality: Optical Transmission Section (OTS), Optical Multiplex Section (OMS) and Optical Channel (OCh)
  with reduced functionality: Optical Physical Section (OPS), Optical Channel with reduced functionality (OChr)

It also defines two layers constituting the digital transport hierarchy: Optical Channel Transport Unit (OTUk) and Optical Channel Data Unit (ODUk)

In addition to the support of ODUk mapping into OTUk (k=1, 2, 3), G.709 supports ODUk multiplexing. It refers to the multiplexing of ODUj (j=1, 2) into an ODUk (k>j) signal, in particular:
  ODU1 into ODU2 multiplexing
  ODU1 into ODU3 multiplexing
  ODU2 into ODU3 multiplexing
  ODU1 and ODU2 into ODU3 multiplexing RFC 4328 adapts GMPLS to control G.709 type OTNs, creating:
  a Digital Path layer corresponding to the ODUk (digital) path layer.
  an Optical Path layer corresponding to the OCh (optical) path layer.
  a label space structure enabling the identification of the exact position of a particular ODUj signal in an ODUk multiplexing structure.

Thus, the GMPLS signaling extensions for G.709 need to cover the messages such as Generalized Label Requests, used to request capacity at nodes along the path as well as the specific technology dependent objects included in the so-called traffic parameters for SONET/SDH networks, Moreover, RFC 4328 also proposes a label space definition suitable for that purpose.

The Generalized Label Request is a message used by RSVP-TE for the signaling of a Label Switched Path (LSPs) on any kind of network technology. It is defined in RFC3471 and extended in RFC 4328 in order to support G.709 OTN architecture. It includes a common part (i.e., used for any switching technology) and a technology dependent part (i.e., the traffic parameters). RFC 4328 extends both parts to accommodate GMPLS Signaling to the G.709 transport plane recommendation.

MESSAGE_ID has been defined as follows:
Class=MESSAGE_ID Class, C_Type=1
Bits 0-7 are flags, bits 8-31 are an epoch field. The next bits 0-31 are a Message_Identifier field. A flag of value 0x01=ACK_Desired flag, indicates that the sender requests the receiver to send an acknowledgment for the message.

The Epoch field of 24 bits takes a value that indicates when the Message_Identifier sequence has reset. It SHOULD be randomly generated each time a node reboots or the RSVP agent is restarted. The value SHOULD NOT be the same as was used when the node was last operational. This value MUST NOT be changed during normal operation. The Message_Identifier field of 32 bits can be combined with the message generator's IP address, to provide a unique message identifier. The values placed in this field change incrementally and only decrease when the Epoch changes or when the value wraps.

The MESSAGE_ID_ACK has been defined as follows:
MESSAGE_ID_ACK Class=24
Class=MESSAGE_ID_ACK Class, C_Type=1
Bits 0-7 are flags. No flags are currently defined. This field MUST be zero on transmission and ignored on receipt. The next 24 bits are an Epoch field copied from the message being acknowledged. The next 32 bits are a Message_Identifier field copied from the message being acknowledged. The RFC also specifies the usage of MESSAGE_ID and MESSAGE_ID_ACK to support RSVP-TE reliable message delivery. This is the quote of the relevant part of the RFC:

"The ACK_Desired flag is set when the MESSAGE_ID object generator wants a MESSAGE_ID_ACK object sent in response to the message. Such information can be used to ensure reliable delivery of RSVP messages in the face of network loss, Nodes setting the ACK_Desired flag SHOULD retransmit unacknowledged messages at a more rapid interval than the standard refresh period until the message is acknowledged or until a "rapid" retry limit is reached. Rapid retransmission rate MUST be based on the exponential back-off procedures defined in section 6. The ACK_Desired flag will typically be set only in trigger messages. The ACK_Desired flag MAY be set in refresh messages."

Figure 1:
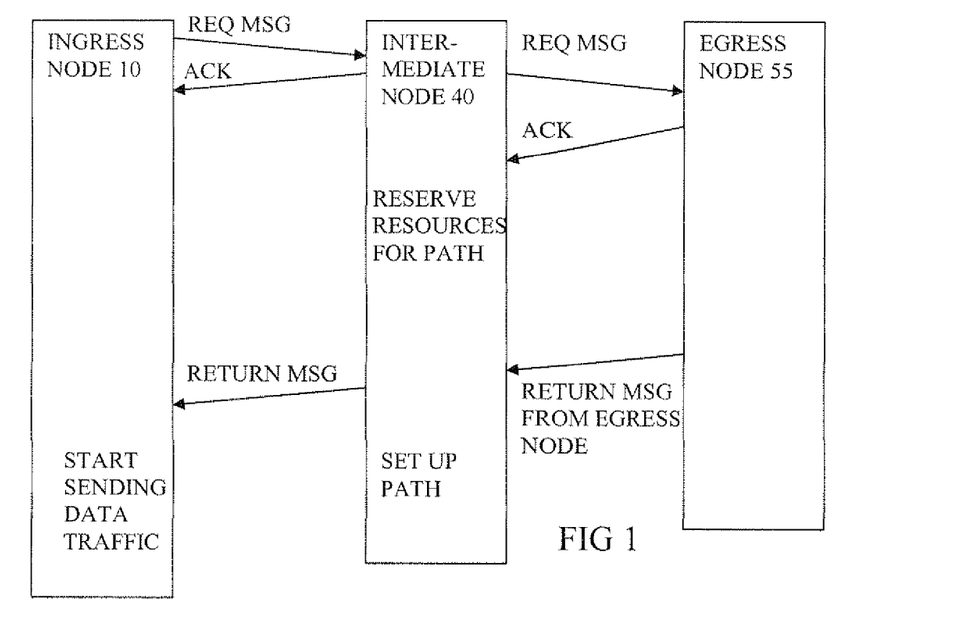
FIGS. 1 and 2 show a schematic view of a sequence of messages passed between nodes based on a conventional protocol.
Figure 2:
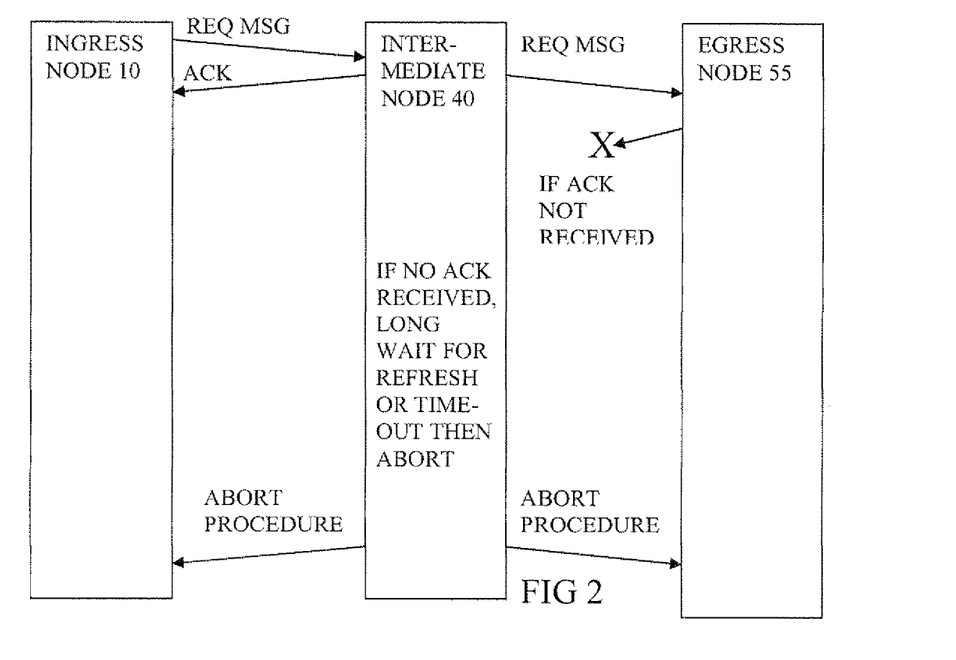

FIGS. 1 and 2, Conventional Sequence of Messages

FIGS. 1 and 2 show a schematic view of a sequence of messages passed between nodes based on a conventional protocol. The left hand block represents an ingress node 10, the middle block represents one of many intermediate nodes 40, and the right hand block represents an egress node 55. A sequence of messages between the nodes is shown by arrows, with time flowing down the figure. A request message is sent from the ingress node to the intermediate node along the path being set up. The intermediate node returns an acknowledgement message and passes the request message on to the next intermediate node and eventually to the egress node. The egress node sends a return message (such as an RSVP RESV message) back along the path to cause the nodes to use the reserved resources to set up the path. Each node responds to the return message to set up the path and pass the message along the path until it reaches the ingress node. The ingress node now knows the path is set up and can start sending data traffic along the path.

As shown in FIG. 2, if no acknowledgement is received at one of the nodes, then that node simply waits for a refresh message to be sent along the path, or for a time out, and then aborts the set up procedure. This can mean a long wait for hours or days even, during which time some of the resources at intermediate nodes are not free for other paths to be set up.

Issues with Existing Message Protocols

The mechanism proposed in RFC 2961 does not specify any consequent action in case of delivery failures. This is due to the fact that the Label Switched Paths (LSP) set up using RSVP-TE are soft-state, that is each node composing the LSP sends refresh messages periodically and in case of they are not received, the LSP is torn down [RFC 2205]. Therefore [RFC 2961] does not state that a delivery failure should trigger any consequent action because it relies on refresh timer elapsing to roll back the action that signaling was performing.

This soft-state mechanism fits well only for packet based LSP, but it is not a good approach for transport network technologies such SDH, OTN or even DWDM. GMPLS controlling non packet networks decouples the fate of the signaling messages and thus of the refresh messages from the fate of the data plane. This decoupling leads to one of the most important requirement of GMPLS applied to transport networks that a failure in the control plane must not affect the data plane. This means the LSP refresh timer is typically set to a very high time (sometimes in the order of days). In this scenario the deletion due to the "cleanup timer" interval may result in resources being allocated for an unnecessary period of time. This may lead to the impossibility of establishing a new connection even if required resources are available (e.g. re-routing may fail and the network is underutilized).

Moreover some GMPLS implementations are based on a hard-state approach that does not imply any refresh mechanism. In this case tearing down a semi-established LSP in case of say, a PATH message delivery failure is even more useful. GMPLS controlled non-packet networks impose that in case of signaling procedure failure, either set-up or tear-down, some consequent actions have to be triggered. For example, in a case of set-up failure due to lack of control plane connectivity between two nodes it is necessary to start a tear-down procedure for the LSP segment already created. In this case, all the nodes that take part in the signaling process must know that signaling failure triggers consequent actions.

Figure 3:
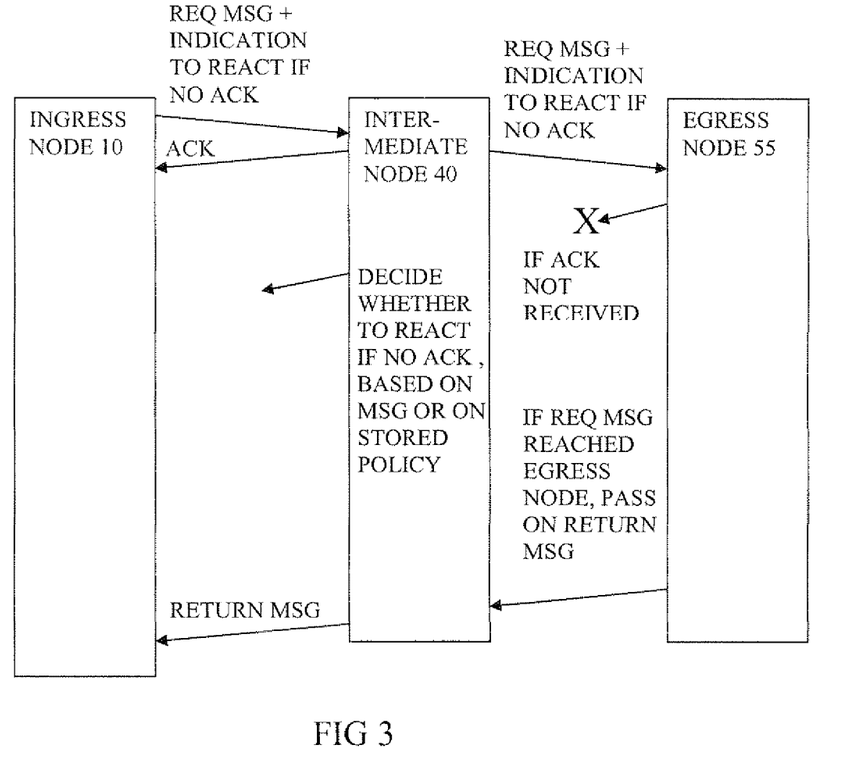
FIG. 3 shows a schematic view of a sequence of messages passed between nodes based on an embodiment.
Figure 4:
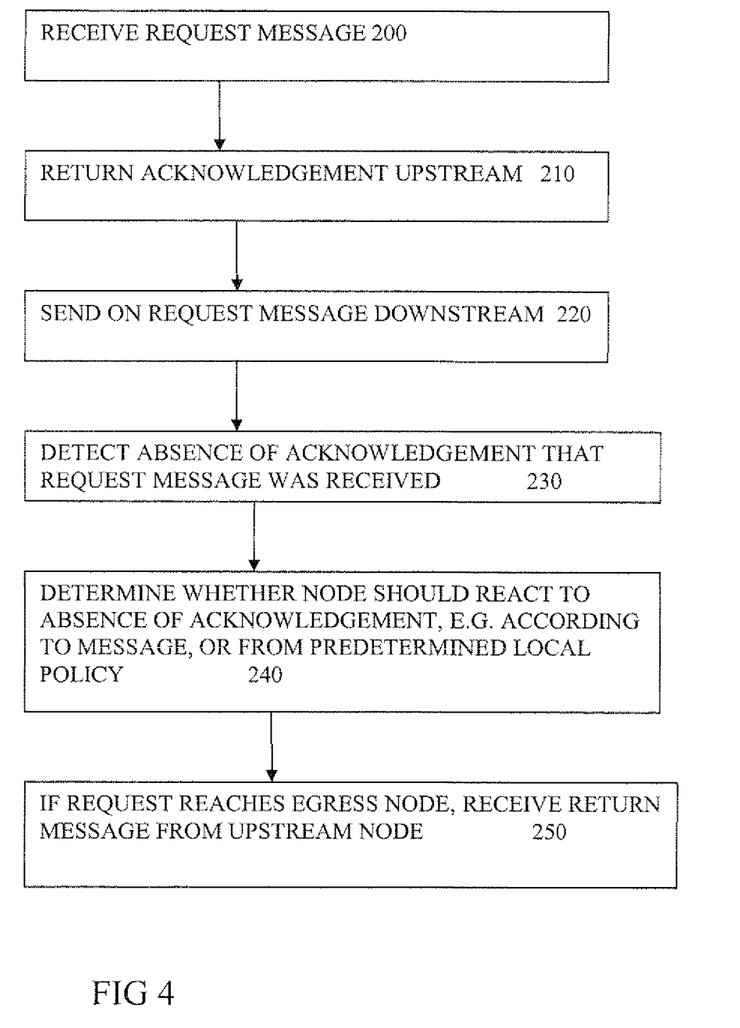
FIG. 4 shows some steps carried out by a node according to an embodiment.

FIGS. 3,4, Embodiments of the Invention

FIG. 3 shows a schematic view of a sequence of messages passed between nodes based on an embodiment. This view has similar parts to those of FIG. 1 or 2, but differs in that the ingress node can be arranged to send an indication to the intermediate node as to whether to react if there is no acknowledgement. Also, the intermediate node is shown as being able to decide whether to react if there is no acknowledgement, based either on the message from the ingress node (if control by the ingress node is desired), or based on a local policy (if local or distributed control is desired).

FIG. 4 shows some steps carried out by a node acting as an intermediate node, according to an embodiment. At step 200, a request message is received, and an acknowledgement is returned upstream at step 210. The request message causes each node that receives it to check that it has sufficient bandwidth or other resource to set up the requested path, and to prevent such available resource from being committed to other paths. The request message is sent on downstream at step 220, and if there is an absence of an acknowledgement that the request message was received, this is detected at step 230. At step 240, the node determines whether it should react to the detected absence, for example by reference to an indication in the request message, or by reference to a predetermined policy stored locally for that node.

At step 250, if the request message has reached the egress node, then the intermediate node can expect to receive a return message from an upstream node, to cause the intermediate node to set up the path using the reserved resources. This can involve for example filling in routing tables or allocating time slots or frequencies or allocating wavelengths or optical paths in optical switches, depending on the switch type for example.

The various steps can be implemented in various ways and other steps can be added, some examples are described in more detail below.

Some Additional Features

In addition to the features of FIG. 3 or 4, embodiments can have other features such as: the step of determining whether to react can involve receiving an indication of whether to react from an upstream node. This enables the ingress node or other node to control the reaction to the absence of the acknowledgement. This can help the ingress node to set up paths more reliably and make more efficient use of network resources.

The step of determining whether to react to the detected absence can involve, also, or instead, the step of looking up a predetermined policy for the given node. This can help enable some control of the reaction to be distributed, and thus enable more diverse nodes to be used. This can enable upgrades to be introduced more gradually for example.

The indication can be a part of the request message. This can be more convenient and more reliable than sending a separate message.

The request message can be an RSVP PATH message. This is a well known protocol, though the indication need not be limited to use with this protocol.

The method can have the step of determining how the node should react to the absence of the acknowledgement. This can help enable different types of reaction to be specified, to suit different policies for example, such as how many retries to try before considering the acknowledgement to be absent, or whether to free up the reserved resources immediately or only after the ingress node has decided whether to try a different route for the path either from the present node or from the start for example.

The method can have the steps of determining that the given node does not support reacting to the absence of the acknowledgement, and returning an error message from the given node to the upstream node. This can help enable the ingress node to learn more information about the nodes and to control the setting up of the path even if not all nodes are of the same version or up to date.

The method can involve determining the absence of the acknowledgement only after one or more attempts at retransmission of the request message. This can help ensure the reaction does not take place unnecessarily due to transient congestion or transient unavailability for any reason.

The method can involve reacting to the absence of acknowledgement by starting an abort procedure to release the reserved resources at the node and upstream nodes. This can help enable the reserved resources to be reused more quickly.

The method can be suitable for an ingress mode, involving sending an indication in respect of this requested path, to a downstream node, indicating whether the downstream node should react to an absence of a corresponding acknowledgement message from a further downstream node.

The method can have the step of receiving an error message at the ingress node, indicating that a downstream node does not support reacting to the absence of the acknowledgement, and selecting either to set up the path without requiring the reaction to the absence at some nodes, or to retry setting up the path along a different route through the nodes. This can help enable the ingress node to choose between a safer, more reliable option of a new route, even though that may not be the optimal route, or choosing the first (presumably best) route with the drawback of inability to react to absence of acknowledgement (and thus risking a long set up if the request message procedure is interrupted).

The method can be implemented using a program on a computer readable medium having instructions which when executed by a processor at a node of a network, cause the processor to carry out the method of any preceding claim.

A corresponding node of a network can be arranged to send the indication as part of the request message.

The node can be arranged to act as an ingress node and have an output part being arranged to send an indication in respect of the requested path, to a downstream node, indicating whether the downstream node should react to an absence of a corresponding acknowledgement message from a further downstream node.

Figure 5:
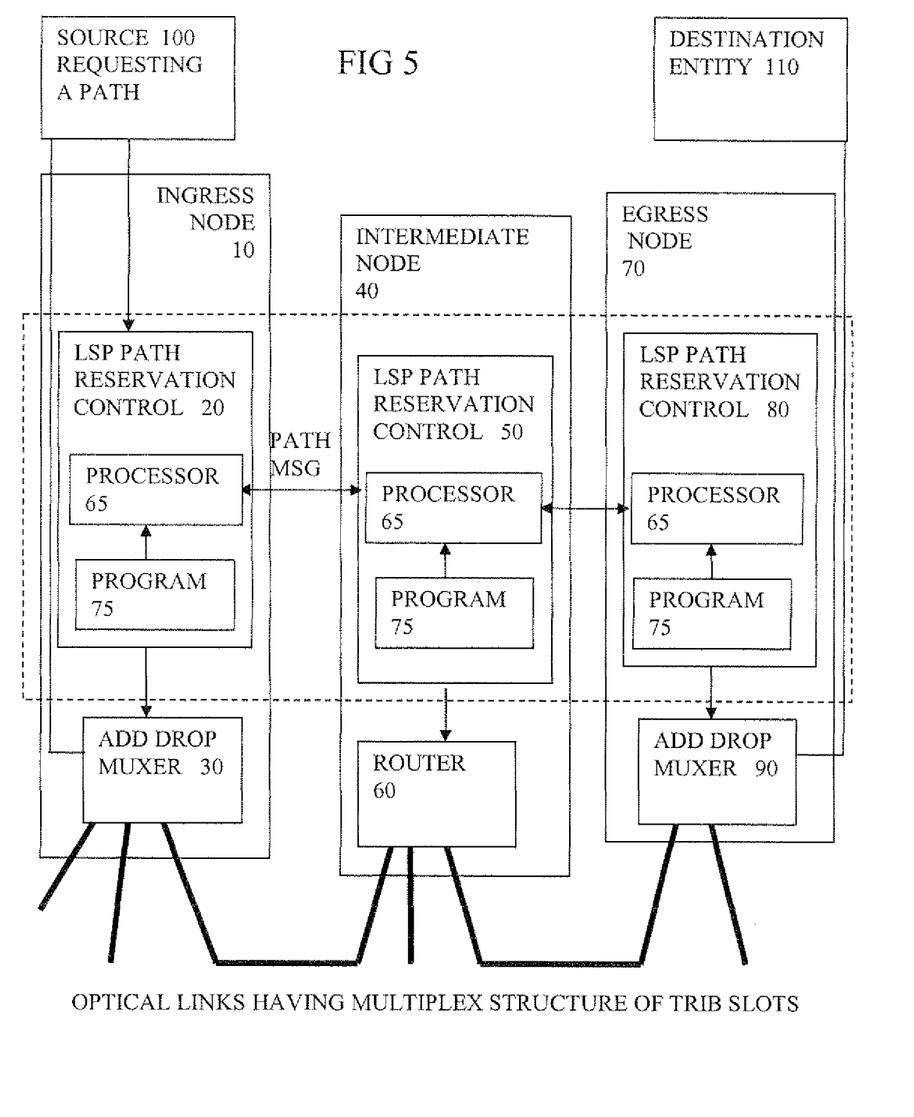
FIG. 5 shows a schematic view of a part of an optical transport network having nodes according to an embodiment.

FIG. 5, Overall View of Nodes According to Embodiments

FIG. 5 shows parts of an optical transport network. Three nodes are shown, there can be many more. An ingress node 10 has an LSR path reservation control part 20, which controls an add drop multiplexer part 30. The reservation control part can have a processor 65 and a store having a program 75 for execution by the processor 65. The program can enable the node to act as an ingress node, or in some cases, to act as an intermediate node for other paths started elsewhere. An intermediate node 40 has its own LSR path reservation control part 50, which controls a router 60. Again, the reservation control part can have a processor 65 and a store having a program 75 for execution by the processor 65. The program can enable the node to act as an intermediate node. If the intermediate node had add drop capabilities, then the program could be chosen to make the node act as an ingress or egress node for other paths. An egress node 70 has its own LSP path reservation control part 80, which controls it's add/drop multiplexer 90. Again, the reservation control part can have a processor 65 and a store having a program 75 for execution by the processor 65. The program can enable the node to act as an egress node for the path shown, or as an ingress or intermediate node for other paths. A source entity 100 is shown, as a source of the traffic for which the new path is needed, through the network to a destination entity 110.

Optical links are shown for carrying the traffic between the nodes, and a connection is shown between the control parts of the nodes for passing messages to reserve the path. This connection can in principle use either the same or different physical links to those used by the traffic between nodes. The optical links for the traffic can have a multiplex structure of trib slots. A path can use one or more of these trib slots, and a reservation procedure needs to indicate which of these trib slots is reserved.

To explain how some embodiments using RSVP can provide an improved path set up process, first, conventional parts of the RSVP process will be described. A first step is the source entity requesting a new label switched path (LSP) from a first node to another node. This first node can be any node which has add or transmit capability, and this now becomes referred to the ingress node for this path. The second node can be any node which has a drop or receive capability, and this now becomes referred to as the egress node for this path. The request can be authorized by a network management system, or by a human operator, and a route to the destination or egress node can be determined. Then a command goes to the ingress node to reserve the path.

The ingress node issues an RSVP-TE PATH message in the form of a generalised label request, for the reservation of the requested LSP, to a next node along the designated path. Each node passes the message on if it recognises it and has capacity to meet the request, in terms of bandwidth along links and capacity through optical switches or routers and so on. Otherwise any intermediate node may return an error message and the ingress node or the network management system can react accordingly, to try a different path for example, or provide an indication to the source.

If the PATH message reaches the egress node, then the egress node returns an RSVP-TE RESV message from the egress node, in the form of a generalised label, back along the path to cause the nodes along the path to reserve resources for the requested path, for traffic of a signal type specified by the PATH message, for example in a trib slot or slots specified by the RESV message. Each intermediate node along the path passes the message along if it can make the reservation, or issues an error message. If the RESV message reaches the ingress node, that indicates that the path has been successfully reserved and can be used for traffic, so this is indicated to the source entity.

Figure 6:
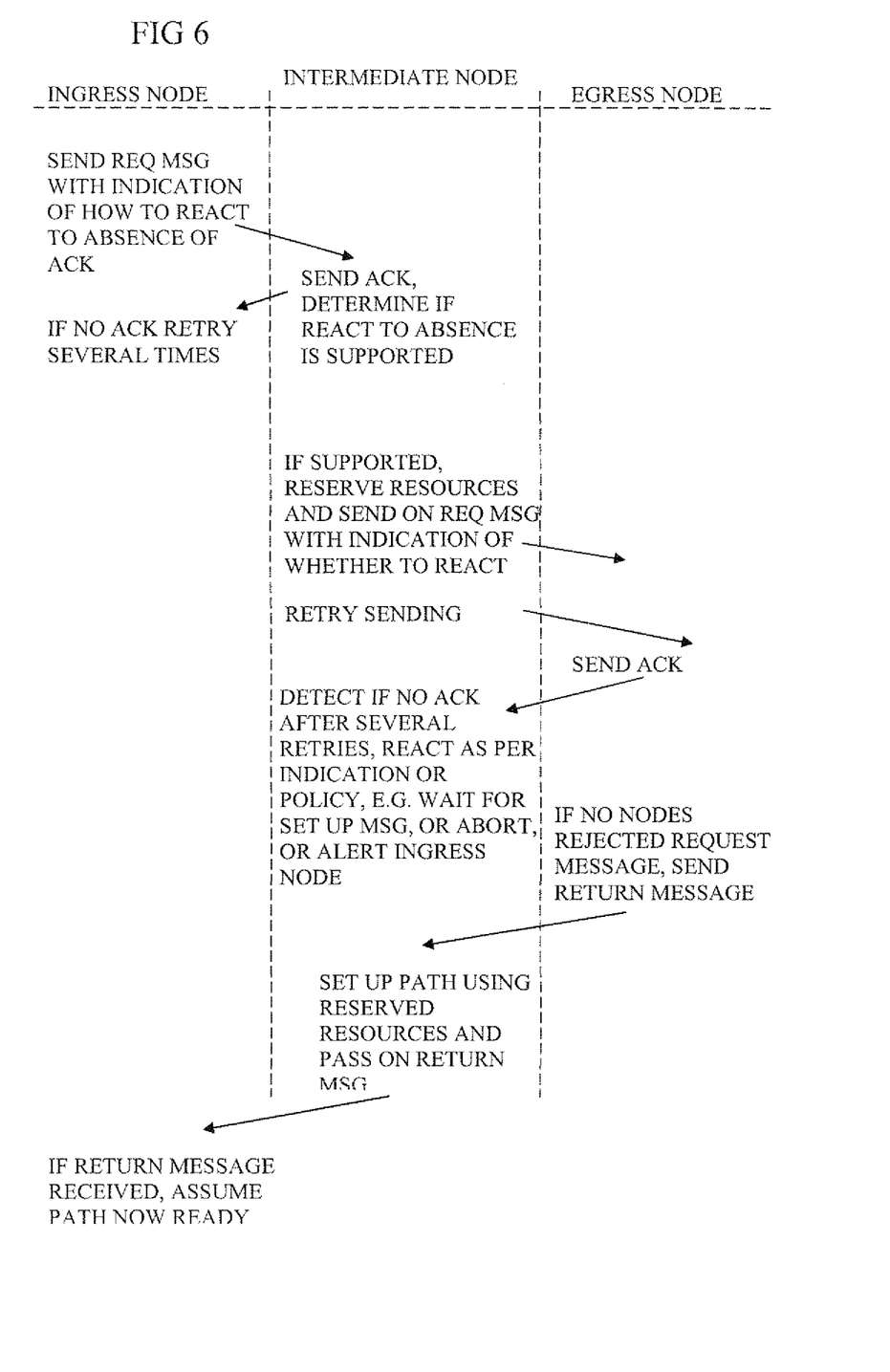
FIGS. 6 and 7 show sequence charts for sequences of operations of the nodes of the embodiment of FIG. 1 or of other embodiments.

FIG. 6, Embodiment Having Intermediate Node Supporting Reacting to Absence

FIG. 6 shows a sequence chart for sequences of operations of the nodes of the embodiment of FIG. 1 or of other embodiments. There are three columns shown, to separate actions at ingress node, intermediate node and egress node respectively, and time flows down the page. A request message is sent from the ingress node, with an indication of how a downstream node should react to an absence of an acknowledgement. The intermediate node returns an acknowledgement to the ingress node. If no acknowledgement is received by the ingress node, it will retry the transmission of the request message. At the intermediate node, if it supports the indication, it will pass on the request message to the next node downstream along the path, with the indication of whether to react still included. Again if no acknowledgement is received, the intermediate node will retry sending. The downstream node (shown here as the egress node, but can be another intermediate node) may send an acknowledge, but if the intermediate node as shown does not detect an acknowledgement, this could be either as a result of the request message not getting through, or the acknowledgement not getting back.

As shown, if no acknowledgement is detected even after a number of retries, then the intermediate node reacts as per the indication from the ingress node or as per the locally stored policy. Examples of possible reactions can be to wait for a return message from the egress node, or abort the set up, or alert the ingress node and await its decision. Which of these possible reactions should be chosen can be specified in the indication in the message, or can be made dependent on current conditions or criteria, such as level of demand in the network, or whether other routes for the path have already been tried and failed for example.

As shown, if the egress node gets the request message, then the return message is returned along the path, assuming no abort procedure has been started. The return message is passed along the nodes to the ingress node. The ingress node can assume the path is now ready and can start transmitting data.

Figure 7:
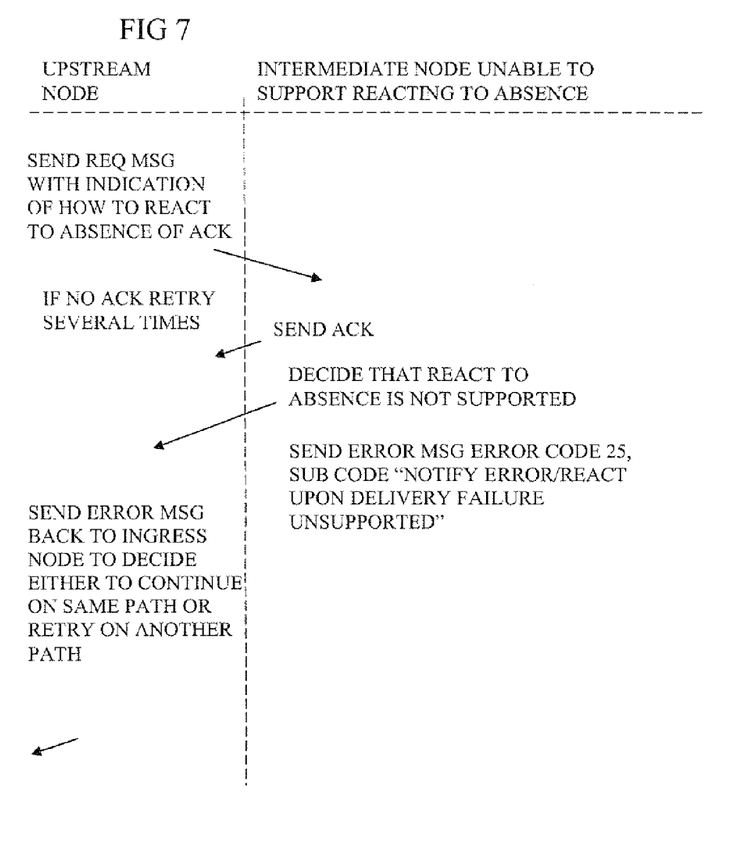

FIG. 7, Embodiment Having Intermediate Nodes not Supporting Reacting to Absence

FIG. 7 shows a sequence chart for sequences of operations of the nodes of the embodiment of FIG. 1 or of other embodiments. In this case two columns are shown, a left hand column for an upstream node and a right hand column for an intermediate node unable to support reacting to absence. As described before for FIG. 6, a request message is sent from the upstream node, with an indication of how a downstream node should react to an absence of an acknowledgement. The intermediate node returns an acknowledgement to the upstream node. If no acknowledgement is received by the upstream node, it will retry the transmission of the request message. At the intermediate node, it is determined that the indication in the request message about reacting to absence is not recognized or recognized but not supported. An error message is returned to the upstream node. This can be for example error code 25, subcode "notify error/react upon delivery failure unsupported". The upstream node receives this error message and sends it back upstream to the ingress node to decide either to continue setting up the path without changing the route, or to retry on a different route via different intermediate nodes.

Figure 8:
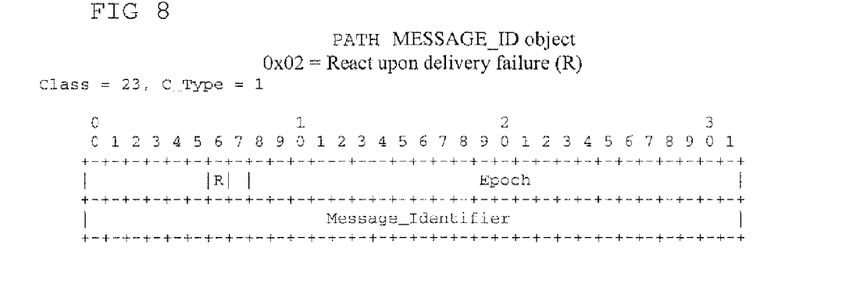
FIGS. 8, 9 and 10 show structures of messages used in some embodiments.

FIG. 8, Request Message Structure with Indication

FIG. 8 shows an example of a request message with an indication of whether to react in the form of a new flag shown as (R) in the flags field of a MESSAGE_ID object. This is to inform the nodes involved in the signaling that in case of missed delivery of a message, consequent actions must be taken. The new flag, called a react upon delivery failure (R) flag, when set, gives the flags field a value 0x02. That flag can also inform nodes participating in the signaling that the LSP requires an explicit trigger in order to be deleted or to abort signaling procedure.

Figure 10:
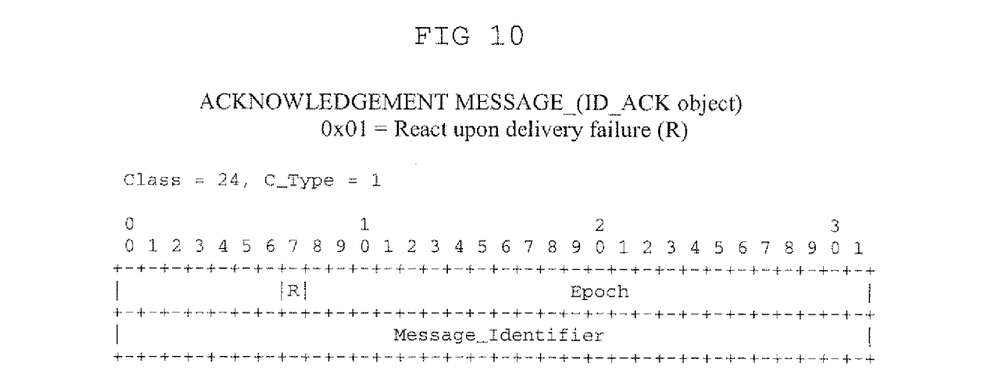

When the React flag is included in the MESSAGE_ID it must be replicated in the MESSAGE_ID_ACK message, as shown in FIG. 10.

If a node does not support the explicit trigger procedure for the LSP then it will not return the React flag in the MESSAGE_ID_ACK. If the downstream node does not support the MESSAGE_ID extension or the explicit trigger procedure it will inform the previous node that, depending on a configuration policy, may go on with the signaling or abort it issuing a Path Error message with the error code/sub-code "Notify Error/React upon delivery failure unsupported" for the affected LSP. Notify Error code is 25; "React upon delivery failure unsupported" sub-code is IANA TBD (suggested 13). This will inform the sender that this procedure is not supported by the downstream node.

The head node (ingress node) of the LSP will see the error and then may re-send the original message without the MESSAGE_ID object or abort the signaling. The nodes of the LSP send a signaling message a configured number of times before starting the appropriate abort procedure. The procedures are dependent on the signaling procedure that fails and reuse already defined RSVP mechanism. However the node must issue a Path Error message with the error code/sub-code "Notify Error/Reliable signaling transmission failure" for the affected LSP. Notify Error code is 25; "Reliable signaling transmission failure" sub-code would need to be agreed by IANA, a proposed code is 12).

In other words, if a first node sends a message with MESSAGE_ID object and the React flag set indicating that MESSAGE_ID_ACK is required, a second node downstream replies with a message containing an MESSAGE_ID_ACK with React flag set, and the same happens between that second node and a further downstream third node.

The second node sends a message towards the third node without receiving any message back. The second node resends the message a configurable amount of times then it must start an abort procedure.

Figure 9:
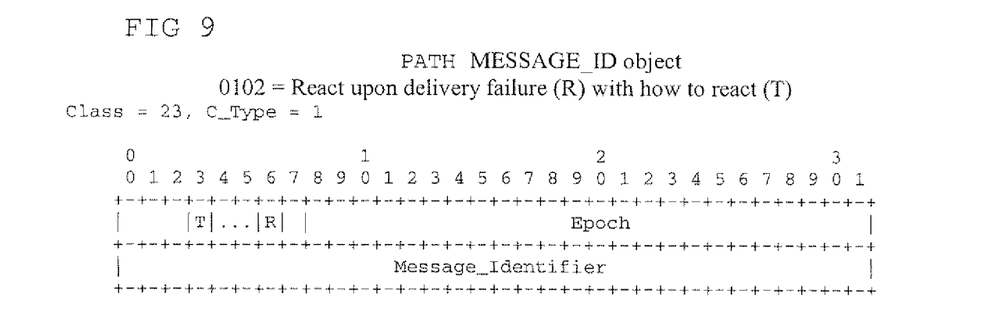

FIG. 9, Request Message Structure Indicating Type of Reaction

FIG. 9 shows a message structure for a request message in the form of an RSVP PATH message object as in FIG. 8 but with a further variation in that there is an indication of how to react to the detected absence. This is a flag (T) at bit 3 of the flags which can indicate the type of reaction, for example if set it can mean abort the setting up, and if not set, it can mean for example alert the ingress node. An equivalent acknowledge object can be envisaged.

As shown above, a standard way is provided to signal that a Network Element supporting GMPLS protocols cannot rely only on refresh mechanisms but requires an explicit trigger for its operation in order to avoid too long wait times before synchronizing states so that unused resources can be released. This also works for hard state LSPs in which nodes that detect signaling failure must start an abort procedure, because refresh mechanisms are not provided. In other words, setting up a label switched path (LSP) for traffic between nodes of a network, involves sending a request message requesting reservation of resources for the requested LSP, from an ingress node (10) via intermediate nodes (40) and returning an acknowledgement message to an upstream node along the path. Absence of an acknowledgement from the downstream node, that the request message was received, is detected. Whether the given node should react to the detected absence can be determined from an indication (R) in the request message. Thus other nodes can react more quickly to take remedial action, to reroute or to remove the resource reservations without a long wait for a time out or a refresh message from the waiting ingress node, to enable more efficient use of the resources. Other variations and embodiments can be envisaged within the claims.

The invention claimed is:

1. A method of setting up a label switched path (LSP) for traffic between nodes of a network, the method having the steps of, at a given one of the nodes:
receiving a request message requesting reservation of resources for a requested path of the LSP, the request message being sent from an ingress node of the requested path, via intermediate nodes along the requested path to an egress node,
returning an acknowledgement message to an upstream node along the requested path, to acknowledge receipt of the request message,
sending the request message on to a downstream node along the requested path, detecting an absence of an acknowledgement from the downstream node, the acknowledgement representing that the request message was received, or that a resend of the request message was received,
determining whether the given node should react to the detected absence, and
receiving a return message sent from the egress node if the request message reaches the egress node, to cause the nodes along the requested path to use the reserved resources to set up the LSP.

2. The method of claim 1, the step of determining whether to react involving receiving an indication of whether to react from an upstream node.

3. The method of claim 2, the indication being a part of the request message.

4. The method of claim 3, the request message being an RSVP PATH message.

5. The method of claim 2 having the steps of determining that the given node does not support reacting to the absence of the acknowledgement, and returning an error message from the given node to the upstream node.

6. The method of claim 1, the step of determining whether to react to the detected absence involving the step of looking up a predetermined policy for the given node.

7. The method of claim 1, having the step of determining how the node should react to the absence of the acknowledgement.

8. The method of claim 1, having the step of determining the absence of the acknowledgement only after one or more attempts at retransmission of the request message.

9. The method of claim 1, having the step of reacting to the absence of acknowledgement by starting an abort procedure to release the reserved resources at the node and upstream nodes.

10. A method of setting up a label switched path (LSP) for traffic between nodes of a network, the method having the steps of, at an ingress one of the nodes,
sending a request message for reserving resources for a requested path of the LSP, the request message being sent from the ingress node of the requested path, via intermediate nodes along the requested path to an egress node, receiving an acknowledgement message from a downstream node along the requested path, to acknowledge receipt of the request message, or that a resend of the request message was received, sending an indication in respect of the requested path, to the downstream node, indicating whether the downstream node should react to an absence of a corresponding acknowledgement message from a further downstream node, and, if the request message reaches the egress node, receiving a return message sent from the egress node if the request message reaches the egress node, to cause the nodes along the requested path to use the reserved resources to set up the LSP.

11. The method of claim 10, and having the step of receiving an error message at the ingress node, indicating that the downstream node does not support reacting to the absence of the acknowledgement, and selecting either to set up the LSP without requiring the reaction to the absence at some nodes, or to retry setting up the LSP along a different route through the nodes.

12. A program on a non-transitory computer readable medium having instructions which when executed by a processor at a node of a network, cause the processor to carry out a method of setting up a label switched path (LSP) for traffic between nodes of a network, the method having the steps of, at a given one of the nodes:

receiving a request message requesting reservation of resources for a requested path of the LSP, the request message being sent from an ingress node of the requested path, via intermediate nodes along the requested path to an egress node, returning an acknowledgement message to an upstream node along the requested path, to acknowledge receipt of the request message, sending the request message on to a downstream node along the requested path, detecting an absence of an acknowledgement from the downstream node, the acknowledgement representing that the request message was received, or that a resend of the request message was received, determining whether the given node should react to the detected absence, and receiving a return message sent from the egress node if the request message reaches the egress node, to cause the nodes along the requested path to use the reserved resources to set up the LSP.

13. A node of a network having a number of other nodes, the node being able to act as an intermediate node and set up a label switched path (LSP) for traffic to others of the nodes, the node having a processor having:

a first input part arranged to receive from a node downstream, a request message for reserving a requested path of the LSP, sent from an ingress node of the requested path, via intermediate nodes along the requested path to an egress node, a first output part arranged to return an acknowledgement message to an upstream node, to acknowledge receipt of the request message, a second output part arranged to send the request message on to a downstream node along the requested path, and a second input arranged to receive an acknowledgement from the downstream node that the request message was received, or that a resend of the request message was received, the processor being arranged to detect an absence of the acknowledgement, and to determine whether the node should react to the detected absence, and a second input part being arranged to receive a return message sent from the egress node if the request message reaches the egress node, the processor being arranged to use the reserved resources to set up the LSP in response to the return message.

14. The node of claim 13, the second output part being arranged to send the indication as part of the request message.

15. A node of a network having a number of other nodes, the node being able to act as an ingress node and set up a label switched path (LSP) for traffic to others of the nodes, the node having a processor having:

an output part for sending a request message for reserving resources for a requested path of the LSP, the request message being sent from the ingress node of the requested path, via intermediate nodes along the requested path to an egress node, an input part for receiving an acknowledgement message from a downstream node along the requested path, to acknowledge receipt of the request message, the output part being arranged to send an indication in respect of the requested path, to a downstream node, indicating whether the downstream node should react to an absence of a corresponding acknowledgement message from a further downstream node, and the input part being arranged to receive a return message sent from the egress node if the request message reaches the egress node, to cause the nodes along the requested path to use the reserved resources to set up the LSP.

* * * * *